United States Patent [19]

Charles

[11] Patent Number: 5,015,167

[45] Date of Patent: May 14, 1991

[54] VACUUM FORMING APPARATUS

[75] Inventor: Robert V. Charles, Littleton, Colo.

[73] Assignee: Ron Charles & Associates, Wilmette, Ill.

[21] Appl. No.: 341,865

[22] Filed: Apr. 21, 1989

[51] Int. Cl.⁵ .............................................. B29C 51/10
[52] U.S. Cl. .......................... 425/388; 425/DIG. 48; 425/DIG. 60
[58] Field of Search ....... 425/388, DIG. 60, DIG. 48; 264/553

[56] References Cited

U.S. PATENT DOCUMENTS

| | | | |
|---|---|---|---|
| 2,690,593 | 10/1954 | Abercrombie | 425/388 |
| 2,814,074 | 11/1957 | Butzko | 425/388 |
| 2,976,658 | 3/1961 | Kostur | 425/388 |
| 3,121,920 | 2/1964 | Doyle et al. | 425/388 |
| 3,156,012 | 11/1964 | Hritz | 425/388 |
| 3,476,377 | 11/1969 | Agrista et al. | 425/388 |
| 3,512,335 | 5/1970 | Rorer | 425/388 |
| 3,553,784 | 1/1971 | Shuman | 425/388 |
| 3,659,991 | 5/1972 | Diamond | 425/388 |
| 3,661,486 | 5/1972 | MacDonald | 425/388 |
| 3,751,208 | 8/1973 | Hepworth | 425/388 |
| 3,822,978 | 7/1974 | Nichols | 425/388 |
| 3,852,014 | 12/1974 | Kimball et al. | 425/388 |
| 3,862,515 | 1/1975 | Baermann | 49/478 |
| 4,157,884 | 6/1979 | Andrae | 425/388 |
| 4,836,765 | 6/1989 | Kornitzky et al. | 425/388 |

OTHER PUBLICATIONS

Advertising Brochure by Formech Inc. entitled "Formech Vacuum Forming Machines", Price List (4 pages).
Advertising Brochure by Formech Inc. entitled "Formech FM1", (2 pages).
Advertising Brochure by Formech Inc. entitled "Formech 450", (2 pages).
Advertising Brochure by Formech Inc. entitled "Formech 660", (2 pages).
Advertising Brochure by Formech Inc. entitled "Formech 300X", (2 pages).
Advertising Brochure by Wing Manufacturing entitled "Magic Molder and Forming Machine", (3 pages).
Dental magazine article entitled "Vacuum Former", (1 page).
Magazine article entitled "7. Vacuum-Forming Stretch-Forming and Casting Parts", published in Building and Improving Vacuum-Formed Model Aircraft, (cover page and p. 35).
Typewritten advertising literature and photographic artwork by Design Reference Inc. on thermal forming machines (15 pages).

Primary Examiner—Jay H. Woo
Assistant Examiner—James P. Mackey
Attorney, Agent, or Firm—Fitch, Even, Tabin & Flannery

[57] ABSTRACT

An apparatus for a vacuum forming plastic sheets includes an upper member with a heater and a base member including a vacuum table. Guide rails extend between the upper member and the base member and confine a sheet-holding carrier for travel between the two members.

7 Claims, 4 Drawing Sheets

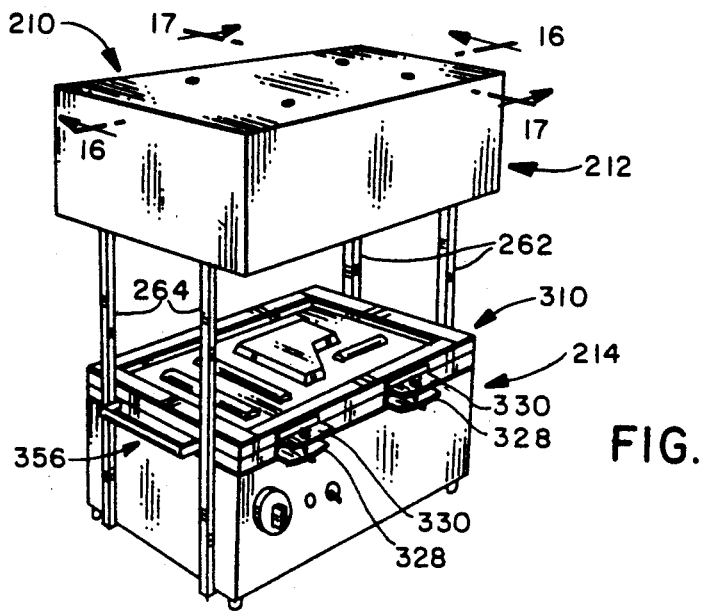
FIG. 15
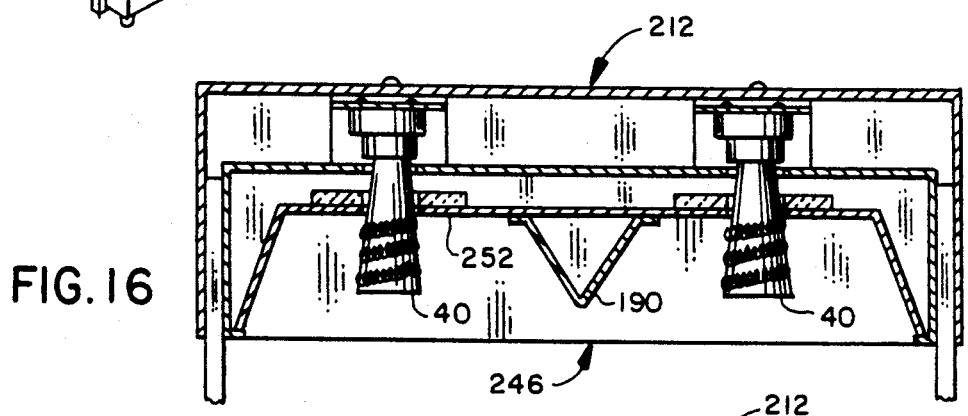
FIG. 16
FIG. 17
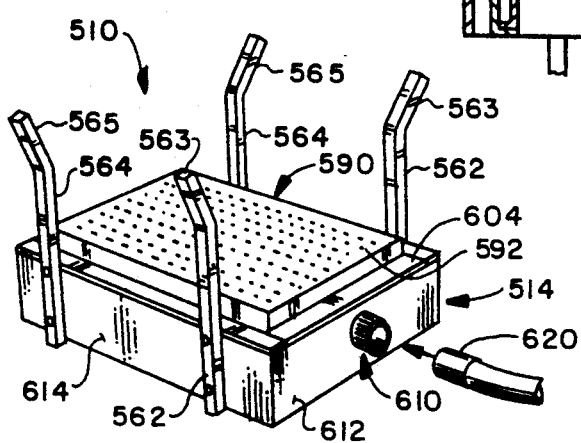
FIG. 18

VACUUM FORMING APPARATUS

BACKGROUND OF THE INVENTION

1. Field of the Invention

The present invention pertains to apparatus for vacuum forming a plastic sheet about a workpiece.

2. Description of the Related Art

As is known in the art, plastic sheets may be softened, and molded about a solid object by laying the plastic sheet over the object and then generating a vacuum thereunder so as to draw the plastic sheet about the workpiece. Heretofore, such machines have been prohibitively costly for hobbyists and for business applications where only a few vacuum formed parts are needed. In addition, such machines have been large and their use made unattractive when the machines are only occasionally required.

As an alternative to large and expensive vacuum forming machines, adaptors have been sold for use with vacuum cleaners. Such adaptors have consisted of a perforated plate with a housing thereunder adapted to be fitted to the flexible hose of a conventional vacuum cleaner. It was contemplated that a user of the adaptor would soften a plastic sheet in an oven, such as that commonly available in a kitchen, and, when softened, the plastic sheet would be carried to the vacuum plate and the vacuum cleaner thereafter energized to produce the necessary vacuum. Such adaptors, however, proved ineffective for some applications, and in general were difficult to use. The heating of a plastic sheet in a remotely located oven and subsequent transport of the softened sheet to the adaptor plate was time-consuming, in the sense that heat from the plastic sheet would be lost to the environment during transport. In addition, it was difficult to accurately align the plastic sheet with the adaptor plate, and a substantial amount of time was often required for an initial draw-down of the sheet against the adaptor plate.

SUMMARY OF THE INVENTION

Accordingly, it is an object of the present invention to provide a vacuum forming machine having a heat source, a vacuum table, and a guide system for directing a carrier holding a plastic sheet, for travel between the two.

Another object of the present invention is to provide a vacuum forming machine having a heat source of improved efficiency.

A further object, according to the present invention, is to provide a vacuum forming machine of the above-described type which is comprised of a minimum number of inexpensive components and which is simple and inexpensive to operate.

These and other objects, according to the present invention, which will become apparent from studying the appended description and drawings, are provided in an apparatus for vacuum forming plastic sheets, comprising:

an upper member;
heater means in the upper member for softening said plastic sheets;
a base member beneath said upper member;
a vacuum table in said base member;
guide rails extending between said upper and said base members;
a carrier for holding a plastic sheet, confined by said guide rails for movement between said upper and said base members and so as to be aligned with said vacuum table when moved theretoward; and
means for releasably holding said carrier adjacent said upper member while the plastic sheet held therein is softened by said heater means.

Other objects are attained in an apparatus for vacuum forming plastic sheets, comprising:

a base member;
a vacuum table in said base member;
opposed pairs of guide rails upwardly extending from said base member;
a carrier for holding a plastic sheet;
said carrier including outwardly protruding handle means extending through respective pairs of said guide rails and being dimensioned for close fit confinement therebetween so as to be confined thereby as said carrier is moved along said guide rails;
said base member including a recessed border surrounding said vacuum table, with said frame being dimensioned to receive the upper portion of said vacuum table for alignment and sealing engagement therewith; and
means for releasably holding said carrier adjacent said upper member while the plastic sheet held therein is softened by said heater means.

BRIEF DESCRIPTION OF THE DRAWINGS

In the drawings, wherein like elements are referenced alike,

FIGS. 9-14 are perspective views of the vacuum forming apparatus, illustrating the various steps of operation of the vacuum forming apparatus, wherein:

FIGS. 9-11 show loading of the sheet carrier in the remaining portion of the apparatus;

FIG. 12 shows the sheet carrier held against the upper heating portion of the apparatus, whereat the plastic sheet is softened;

FIG. 13 shows the sheet carrier, with a softened plastic sheet being lowered onto the base portion of the apparatus, whereupon a vacuum is drawn; and FIG. 14 shows removal of the sheet carrier, with a vacuum-formed hardened plastic sheet being removed from the remainder of the apparatus.

FIG. 15 is a perspective view of an alternative form of a vacuum forming apparatus illustrating aspects of the present invention;

FIG. 16 is a fragmentary cross-sectional view taken along the line 16—16 of FIG. 15;

FIG. 17 is a fragmentary cross-sectional view taken along the line 17—17 of FIG. 15; and FIG. 18 is a perspective view of another alternative form of a vacuum forming apparatus illustrating aspects of the present invention.

DETAILED DESCRIPTION OF THE PREFERRED EMBODIMENTS

Figures 1, 2, 3:
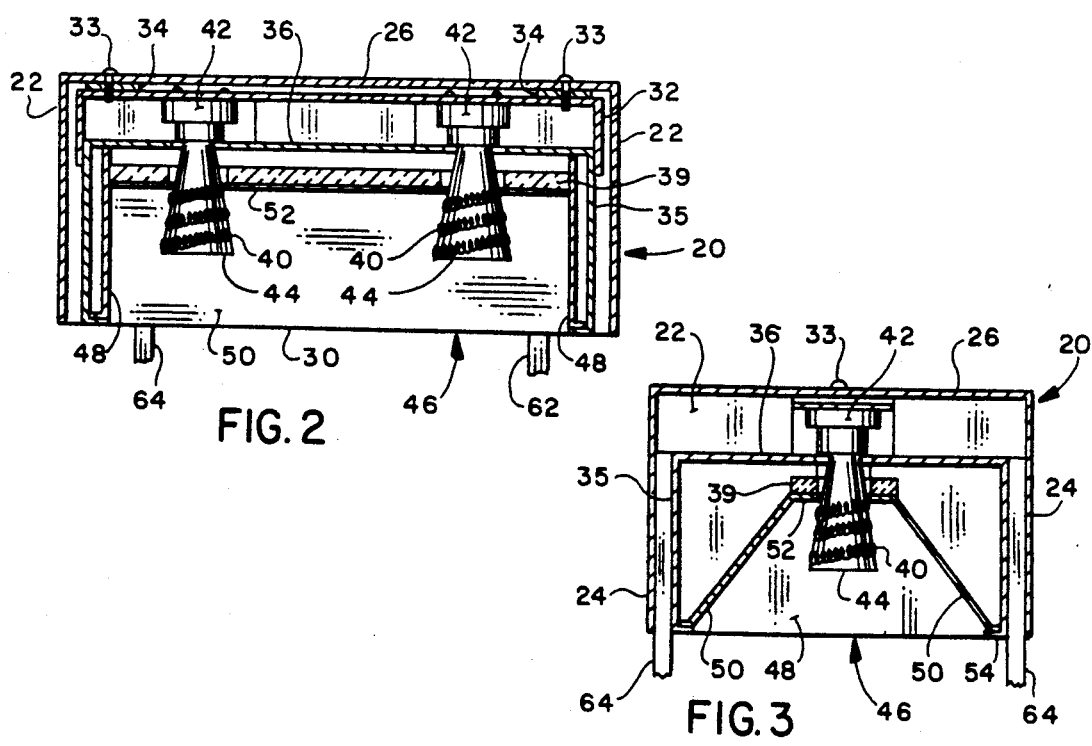
FIG. 1 is a perspective view of a vacuum forming apparatus illustrating aspects of the present invention.
FIG. 2 is a fragmentary cross-sectional view taken along the line 2—2 of FIG. 1.
FIG. 3 is a fragmentary cross-sectional view taken along the line 3—3 of FIG. 1.

Referring now to the drawings, and initially to FIG. 1, a vacuum forming apparatus is generally, indicated at 10. Apparatus 10 includes an upper member or top part 12 overlying a base member which is generally indicated at 14. As will be seen herein, the top part 12 and base member 14 include housings for components of the vacuum forming apparatus and are preferably made of sheet metal or the like rigid material.

The top part 12 includes a sheet metal housing 20 having a pair of smaller sidewalls 22 and a pair of larger, opposed sidewalls 24. Housing 20 is enclosed at its upper end by a top wall 26.

Referring now to FIGS. 2 and 3, the housing 20 has a downwardly opening lower end 30 providing access to the hollow interior thereof. An internal hanger 32 is mounted to top wall 26 by a pair of standoff fasteners 33 and spacers 34. A generally rectangular internal housing 35 includes sidewalls and an upper wall 36 spaced from the hanger, as well as the top wall 26 of the outer housing 20.

A pair of radiant heater elements 40 have mounting bases 42 secured to the upper wall of internal hanger 32. The radiant heaters 40 of the preferred embodiment comprise heater elements, or heater wires made of NI-CHROME, or the like material, wound about a ceramic core of truncated conical configuration. Thus, the free ends 44 of the radiant heaters 40 have a generally circular configuration. Electrical wires (not shown) are provided to electrically connect the wire elements of the radiant heaters to an external source of power. The cavity formed between the hanger 32 and the housing 35 provides a convenient chamber for enclosing the electrical leads.

A reflector shield assembly 46 is disposed within the rectangular housing 35 and, like the inner and outer housings, 35,32, has a downwardly opening lower end. The reflector shield assembly 46 includes trapezoidal endwalls 48, generally rectangular slanted sidewalls 50 and a generally rectangular top wall 52. The endwalls 48 of the reflector shield are bent at their free ends to mate with a lower border 54 of internal housing 35. The border 54 has a generally rectangular configuration, surrounding the interior heating cavity 53 defined by the reflector shield assembly. As indicated in FIG. 2, the sidewalls 48 are spaced from the sidewalls of both the internal and external housings 35, 20, thus assuring that a user will not inadvertently touch heated surfaces of the apparatus during the operation thereof. The top walls of the reflector, inner housing and outer housing are also spaced apart from one another for these same reasons. In addition, an insulating layer 39 may also be employed to reduce heating of the housings, and to trap heat in the heating cavity 53 surrounded by the reflective surfaces 48, 50, and 52, thus further improving the heating efficiency of the apparatus.

With reference to FIG. 3, the top wall 52 of the reflector shield encloses the radiant heaters 40, so as to re-radiate the heat energy therefrom in a downward direction. As will be seen herein, a plastic sheet S to be softened is held in a carrier which is pressed against the border 54. The combination of the radiant heaters 40 and the reflector shield assembly 46 described above, has been found to produce a generally uniform distribution of heat energy throughout the surface of the plastic sheet, without developing "hot spots" i.e., local areas of increased temperature. According to one aspect of the present invention, the radiant heaters 40 approximate "point sources" or relatively small localized sources compared to the area of the opening surrounded by border 54. The reflector surfaces surrounding the discrete radiant heaters 40, results in a heretofore unattained heating efficiency and can be fabricated using relatively low cost conventional construction techniques.

Referring to FIGS. 1-3, four guide rails extend between the top part 12 and base member 14. The guide rails referred to herein include a first pair of guide rails 62 disposed at one end of the major walls 24 of upper housing 20. A second pair of guide rails 64 are disposed at the other end of the major walls 24. Thus, each major wall 24 of upper housing 20 is associated with a guide rail 62 and a guide rail 64. As can be seen from FIG. 1, the guide rail 62, 64 continuously extend from top part 12 to base member 14. The base member 14 includes a lower housing 68, having a pair of opposed minor sidewalls 70 and a pair of opposed major sidewalls 72. Lower ends of the guide rails 62, 64 are secured to the major sidewalls 72 by screw type fasteners 74 (see FIG. 1).

Disposed within the lower housing 68 is a self-contained vacuum source which is preferably operated by an electrical switch 84, as shown in FIG. 1, mounted to one of the minor sidewalls 70 of lower housing 68. As can be seen in the cross-sectional view of FIG. 5, the guide rails 62, 64 preferably comprise hollow, square tubing, and thus provide a convenient metallic conduit for the electrical leads referred to above, which provide electrical connection to the radiant heaters 40. The electrical leads are preferably trained through one or more of the guide rails 62, 64 and are connected through an electrical control 86 illustrated in FIG. 1, adjacent the switch 84. As will be seen herein, a carrier is reciprocated back and forth between the upper and lower members, and the aforementioned construction of the guide rails 62, 64 has been found to provide a rigid construction despite such reciprocation.

Figure 4:
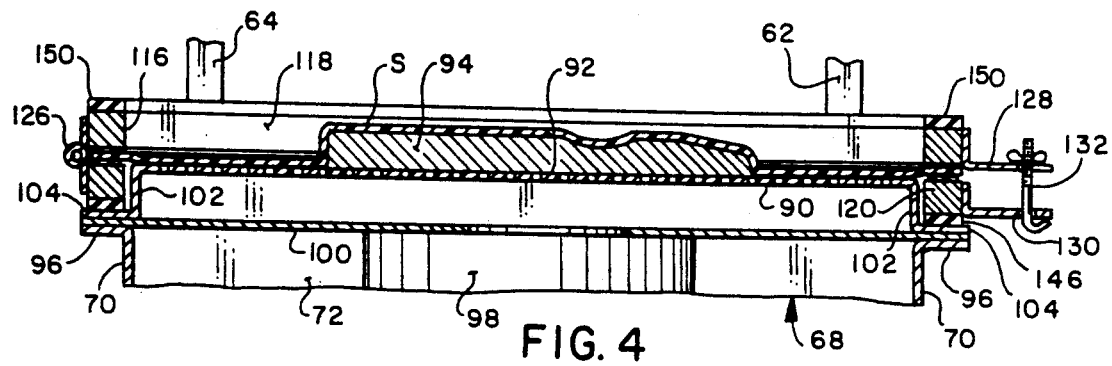
FIG. 4 is a fragmentary cross-sectional view showing the mating of the sheet carrier and vacuum table, taken along the line 4—4 of FIG. 1.
Figure 5:
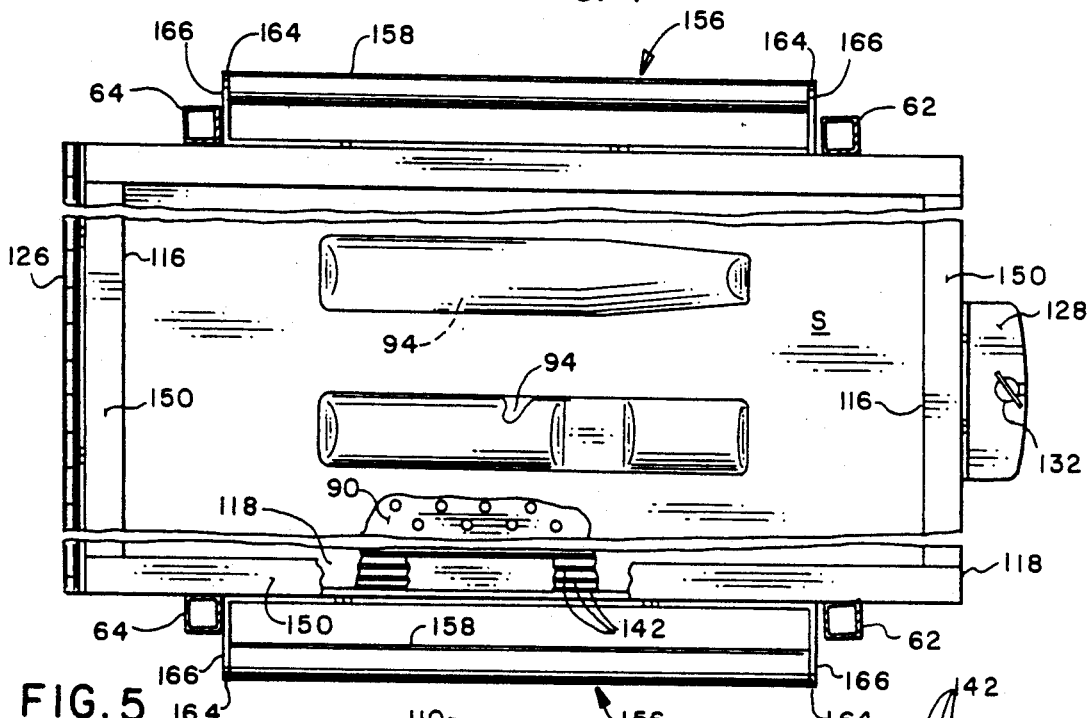
FIG. 5 is a cross-sectional, partially broken away view, taken along the line 5—5 of FIG. 1, showing the sheet carrier and base portion of the machine in plan view.
Figure 9:
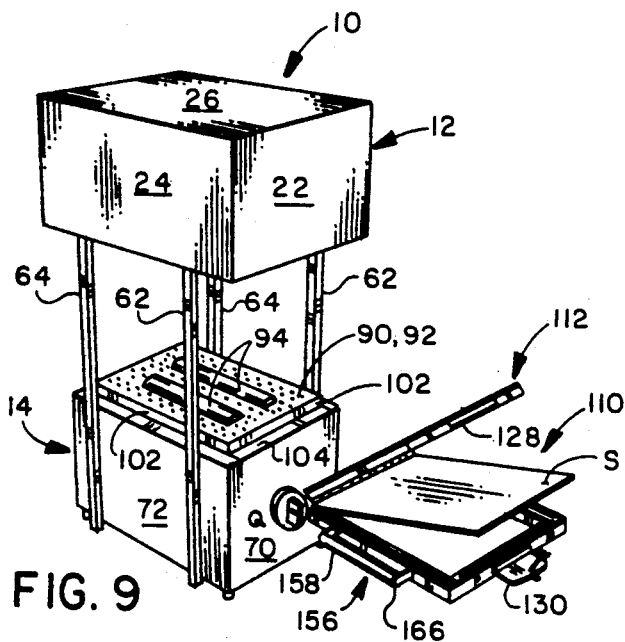

Referring now to FIGS. 4, 5 and 9, the lower housing 68 is enclosed at its upper end by a platen, having a perforated vacuum plate 92 at its upper end. The perforations in plate 92 allow a vacuum to be drawn therethrough, and as will be seen, the softened plastic sheet is placed against the perforated vacuum plate 92 to form a vacuum seal with the perforated plate, thereby exerting a vacuum-drawn force to the plastic sheet S, causing the sheet to conform to a workpiece such as that illustrated at 94 in FIG. 4.

Referring again to FIG. 4, the sidewalls 70 of lower housing 68 have outwardly turned edges 96 to provide an upwardly facing mounting surface. The major sidewalls 72 of lower housing 68 have similarly outturned lip portions. A vacuum pump 98 is secured to an internal mounting plate 100, the outer periphery of which is placed atop the mounting lip 96 of the lower housing sidewalls. The vacuum pump 98 is preferably powered by an electrical motor, not shown, the energization of which is controlled by the aforementioned switch 84.

Referring again to FIG. 4, the platen 90 is preferably formed with vertical sidewalls 102 which are outwardly bent at their free edges to form a mounting lip 104. In the preferred construction, the internal mounting plate 100 is positioned between the mounting lips 96, 104 which are secured together with threaded fasteners, rivet fasteners, welding or the like suitable fastening means to form a vacuum-tight structure. As illustrated in FIG. 4, the vertical sidewalls 102 of platen 90 have a relatively substantial vertical dimension and, considering the mounting plate in its three dimensional aspects, present a vertically extending border surrounding the perforated vacuum plate 92 of platen 90. The aforementioned mounting lip 104 can now be seen to comprise an upwardly facing recessed border surrounding the perforated vacuum plate 92, being disposed therebelow.

Figure 6:
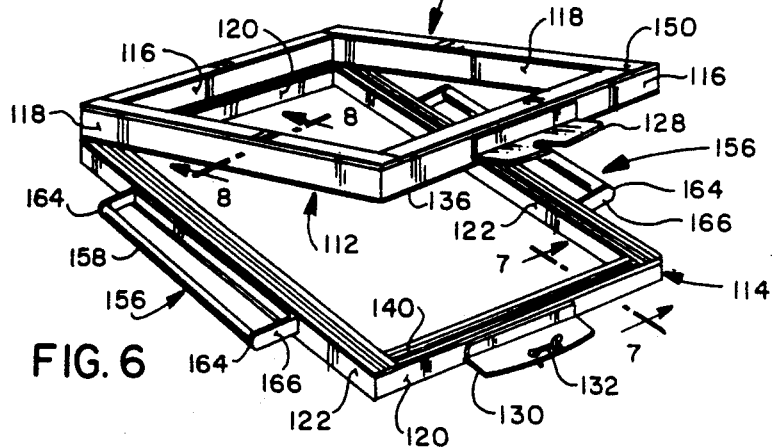
FIG. 6 is a perspective view of the sheet carrier.

Turning now to FIGS. 5 and 6, a carrier 110 for holding the plastic sheet S to be formed, is comprised of upper and lower generally frame-like members 112, 114. The upper member 112 has minor wall portions 116 joined at their ends to major wall portions 118, so as to form a rectangular frame member therewith. The lower frame 114 is similarly constructed, having minor walls 120 joined at their ends to major walls 122.

The minor walls 116, 120 of the upper and lower frame members are rotatably joined together by a hinge 126 which is visible in the illustration of FIG. 4. The opposed minor walls 116, 120 of the upper and lower frame members have interengaging releasable clamping members 128, 130 joined thereto. The clamping members 128, 130 preferably have a step-plate configuration, with the upper plate 128 being slotted to receive a threaded bolt fastener 132, held captive in the lower clamp member 130.

Figure 7:
FIG. 7 is a cross-sectional view of the lower frame member of the sheet carrier, taken along the line 7—7 of FIG. 6.
Figure 8:
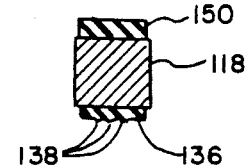
FIG. 8 is a fragmentary cross-sectional view of the upper frame member of the sheet carrier, taken along the line 8—8 of FIG. 6.

With reference to FIGS. 7 and 8, the upper frame member 112 has the opposing surfaces thereof covered with a suitable gasket material. In the preferred embodiment, the lower surface of the upper frame member is covered by a resilient gasket 136 having a number of generally parallel outwardly protruding ribs or fins 138 which are useful for providing multiple or redundant vacuum-tight seals with a plastic sheet inserted within the carrier. The upper surface of the lower frame member 114 has a similar gasket 140, also with outwardly extending ribs or fins 142. As illustrated in FIG. 4, the carrier is pressed into engagement with mounting lip 104. It is desirable to form a vacuum-tight seal at that point of engagement, and accordingly the lower surface of the lower frame member 114 may be provided with a suitable gasket. In the preferred embodiment, however, a gasket 146 is provided at the recessed border 104. The gasket 146 preferably comprises a resilient foam material, but could also comprise a resilient strip magnet, although the magnetic attraction may not be required because of the pulling force of the vacuum pump 98, which maintains a sealing engagement between the carrier and the mounting lip 104. The opposed upper surface of the carrier 110 is however preferably sealed with a resilient magnetic strip gasket 150 to provide a releasable holding of the carrier with the top part 12, and which may also be relied upon to form a continuous airtight seal with the surrounding border 54 of the top part 12 housing the heating elements.

Turning now to FIG. 6, the carrier 110 further includes a pair of handles 156 disposed on the major sides 122 of the lower frame member 114. The handles 156 include elongated manually graspable central portions 158 disposed between a pair of mounting brackets 164, which preferably are formed by bending the ends of a unitary elongated strip of metal, the central of portion of which is fastened to the sidewalls 122 of the carrier member by any suitable means such as welding, threaded fasteners or rivets. According to one aspect of the present invention, the mounting brackets 164 include outwardly facing generally planar, and preferably rectangular guide surfaces 166. The guide surfaces 166 extend in an outward direction away from the sidewall 122, and also have a substantial thickness in their minor dimension.

Referring initially to FIG. 4, assuming a carrier is in the closed position, the releasable fastener 132 is removed from the upper member 128, and the upper and lower carrier members can then be opened in the manner illustrated in FIG. 6 by rotation about hinge 126. A plastic sheet S can now be inserted in the opening between the frame members. When inserted in carrier 110, the plastic sheet will engage the ribbed gaskets 136, 140 of the upper and lower frame members 112, 114. As the carrier members are drawn together and the releasable locking means 132 is reinstalled, a compressive force is exerted about the periphery of the plastic sheet S by contact with the resilient gaskets 136, 140, which preferably continuously extend throughout the opposed mating surfaces of the frame members. As the resilient gaskets are compressed, the ribs 138 of the upper gasket 136, and the ribs 142 of the lower gasket 140, are pressed against the plastic sheet S, forming redundant, continuous vacuum seals about the sheet periphery. With the plastic sheet thus installed in the manner illustrated in FIG. 9, the carrier is then inserted between the top part 12 and base member 14.

Figure 10:
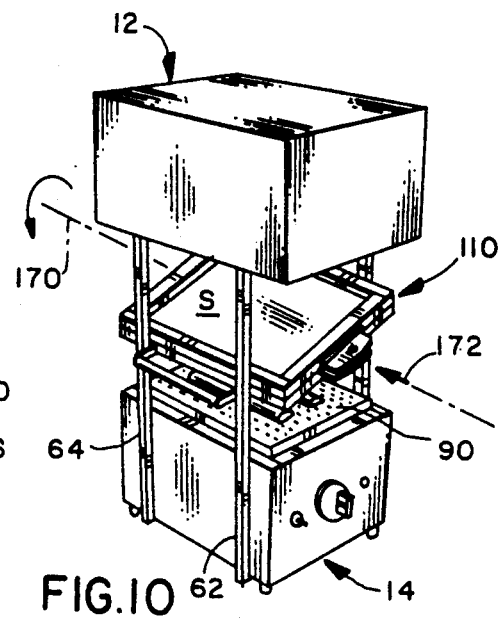

As can be seen in the various figures, an opening is formed between the guide rails 62 and the top part 12 and base member 14. With reference to FIG. 10, the carrier is then rotated about a central axis 170 thereof, which extends parallel to the major sidewalls 118, 122 and the handle members 158. The hinged end of the carrier is then inserted between guide rails 62 in the direction of arrow 172, until the handles 156 are located between adjacent guide rails 62, 64. The carrier is then rotated in a reverse direction about axis 170 until the sheet S is disposed in a generally horizontal plane, so as to be perpendicular to the plane of the upper border 54, the vacuum plate 92, and the lower recessed border 104. The handles 156 are thereby inserted between adjacent guide rails 62, 64.

With reference to FIG. 5, according to one aspect of the present invention, the handles 156 are dimensioned such that the guide surfaces 166, at the ends thereof, are closely spaced to the guide rails 62, 64 when inserted therebetween. As mentioned above, the guide rails 62, 64 preferably have a square or a rectangular cross-section, which, as will now be seen, is advantageous in presenting generally flat, continuous guide surfaces to the guide surfaces 166 of the carrier handles. The substantial minor dimension, or "height" of the guide surfaces 166 plays an important role in resisting a rocking of the carrier about an axis passing through handles 156, generally perpendicular to the aforementioned axis 170.

According to another aspect of the present invention, the carrier is dimensioned such that the major sidewalls 118, 122 of the carrier members are closely spaced between the guide rails 62 and between the guide rails 64, in the manner illustrated in FIG. 5. Thus the carrier is confined with respect to displacement in the direction of an axis lying in the plane of the carrier, extending generally perpendicular to the aforementioned axis 170. By reason of the close fit engagement between the handle guide surfaces 166 and the adjacent guide rails 62, 64, the carrier is also constrained against movement in directions along the axis 170. With reference again to FIG. 5, the free ends of handle brackets 164 extend a considerable distance, outwardly beyond the guide rails. Thus, a very deliberate effort must be made to rotate the carrier out of confinement of the guide rails.

As can now be seen, the carrier is constrained against movement in all directions, except the generally vertical direction necessary for travel between the top part 12 and lower member 14. In operation, a user grasps the handles 156 at their mid-portions 158, and either pulls or pushes the carrier in generally vertical directions between the top part 12 and lower member 14. For reasons which will soon become apparent, it is important that the generally coplanar alignment between the plastic sheet S and the vacuum table be maintained, especially when the softened sheet is placed over the work pieces and the vacuum table, in preparation of a vacuum being drawn thereunder. As can now be seen, any inadvertent misalignment of the carrier during reciprocation thereof along the guide rails is easily prevented.

Figure 11:
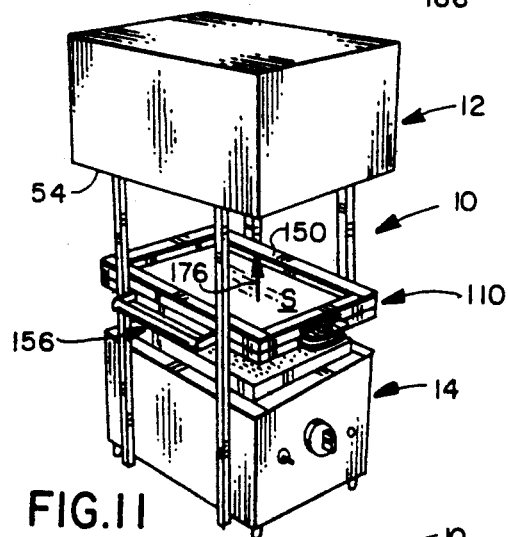

Referring now to FIG. 11, after the carrier is inserted between the guide rails, the carrier is moved in the upward direction of arrow 176 by pulling upwardly on handles 156, so as to slide the carrier along guide rails 62, 64. The carrier is raised into contact with the upper member 12, bringing the magnetic gasket 150 into contact with the upper border 54, which surrounds the opening to the heating cavity 53 defined by reflector shield assembly 48.

Figure 12:
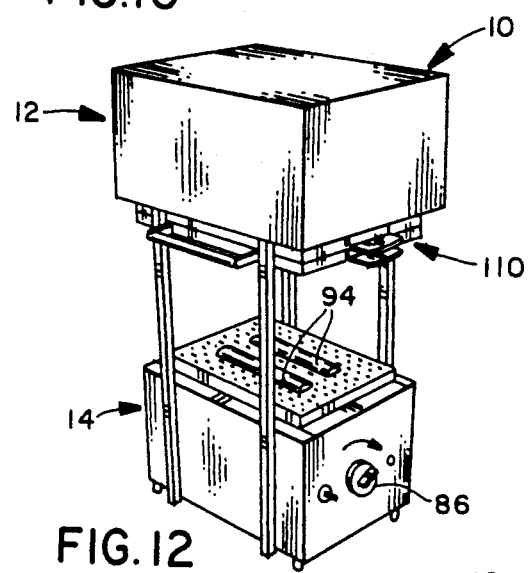

With reference to FIG. 12, the control 86 is operated to energize the radiant heaters 40. The control 86 can operate by limiting the voltage applied to the heater elements, for example, or can comprise a timer which interrupts the current flow to the heating element after the desired amount of energy is let through. In the preferred embodiment, control 86 comprises an "infinite switch" by which current flow to the heaters is switched on and off during a heating cycle of operation. The current switching, which controls the duty cycle of the heaters, has been found to be especially useful for heating thinner plastic sheets, and for certain clear plastic materials which release trapped moisture during the inactive portions of the duty cycle. If desired, the heating currents to the several heating elements can be staggered, i.e., switched between the heating elements, to increase the diversity of the electrical load on the power source.

The carrier 110 is maintained in releasable engagement with the top part 12 until the plastic sheet is sufficiently softened. The apparatus, according to the present invention, uniformly heats the plastic sheets by the radiation incident thereon, either directly from the heating elements or from the surfaces of reflector shield assembly 48.

According to another aspect of the present invention, additional heating benefit can be obtained, since the releasable joinder of the carrier to the top part 12 is provided by a magnetic gasket 150, which also forms a continuous airtight seal with border 54. This seal eliminates convection losses within the heating cavity 53 caused by the intrusion of relatively cooler ambient air into the heating cavity 53, or the escape of heated air therefrom. The seal also eliminates cooling or reduced heating at the sheet periphery, thus avoiding non- uniformities which, in some situations, might impair proper heat treatment of the plastic sheet, and which might reduce the available, working area thereof.

Figure 13:
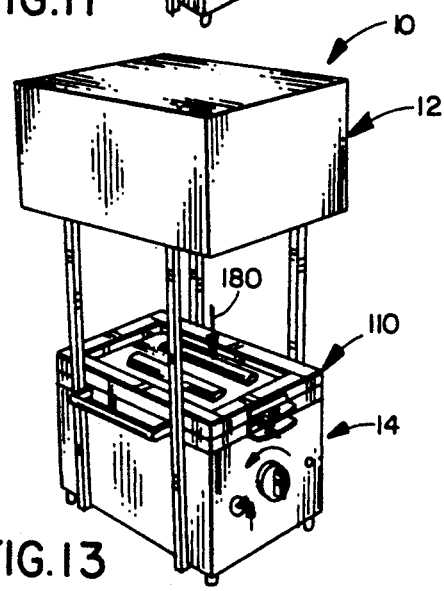

With reference to FIG. 13, the carrier is then lowered out of contact with top part 12, and is slid along guide rails 62, 64 in the downward direction of arrow 180 toward the vacuum plate 92. As those skilled in the art will appreciate, it is important that a properly softened plastic sheet be prevented from cooling, prior to being drawn down against the workpieces and the vacuum table. The aforementioned advantages in guiding the carrier along rails 62, 64 allows an operator to concentrate on lowering the carrier with as much speed as possible, since attention need not be given to the path of travel of the carrier, and as will now be discussed, the alignment of the carrier with the vacuum table.

As has been mentioned above, it is important that a properly softened plastic sheet be vacuum drawn as quickly as possible, since the physical properties of the sheet vary significantly with temperature. In order for the vacuum source to apply a significant amount of force to the plastic sheet, at least a minimal vacuum seal must be achieved between the plastic sheet and the perforated vacuum plate, which comprises the working surface of the vacuum table provided in the base. This requires a fairly accurate alignment between the plastic sheet and the platen surface. With the alignment features provided by vacuum forming apparatus, constructed according to the present invention, the initial alignment necessary to initiate a vacuum draw-down of the plastic sheet is quickly and easily attained.

For example, the carrier holding the plastic sheet is easily maintained in a generally horizontal orientation, as the sheet is moved from the top part 12 to the base member 14, as illustrated in FIG. 13. The aforementioned construction of the carrier provides a relatively strong, gripping force at the outer periphery of the plastic sheet as the sheet is wrapped about workpieces placed on the platen, such as the workpieces 94 illustrated above. Referring again to FIG. 4, the preferred construction of the carrier 110 and the vacuum table of the base member insures a rapid sealing of the plastic sheet over the surface of vacuum plate 92, which is achieved with a simple and accurate alignment of the carrier to the base member.

As illustrated in FIG. 4, the wall members of the lower frame member 114 form a close fit engagement with the vertical walls 102 of platen 90 surrounding vacuum plate 92. Thus, any air leakage path underneath the surface of gasket 146 is forced to enter the relatively close spacing, and hence have a reduced effect. In addition, the guide features described above assure the lower gasket 146 at the bottom of carrier 110 will be rapidly engaged with the border 104 surrounding the platen, thereby providing a sealing engagement therewith.

Depending upon the height of the workpieces 94 laid on the platen surface, contact is typically made at the corners between the platen and the vertical wall 102 which, along with the close spacing between the wall members 120, 122 of the carrier and the engagement between the lower carrier gasket 146 and the recessed border 104, creates an initial vacuum seal to allow the vacuum forces applied against the sheet to very quickly rise in magnitude. With reference to FIG. 4, as the sheet is drawn into contact with the platen, the vacuum seal is quickly completed even prior to a time when the plastic sheet is made to fully conform to the outer periphery of the workpiece.

However, as those skilled in the art will appreciate, it is important that the plastic sheet not be overly stretched during draw-down as the thickness thereof can become greatly reduced, especially at points of stress. Accordingly, it has been found important to quickly attain an initial alignment between the plastic sheet and the platen surface. This alignment is quickly and easily attained when the carrier is positioned about the vacuum table, such that the platen sidewalls 102 are received in the lower frame member, with the lower surface of the lower frame member engaging platen border 104. When fully seated on border 104, the lower frame member has its gasket 140 aligned generally coplanar with the vacuum plate surface. Of course, it is important that a vacuum-tight engagement be maintained between the plastic sheet and the gasket 140 of the lower frame member, since air gaps at that point would greatly reduce the vacuum forces applied to the plastic sheet.

Figure 14:
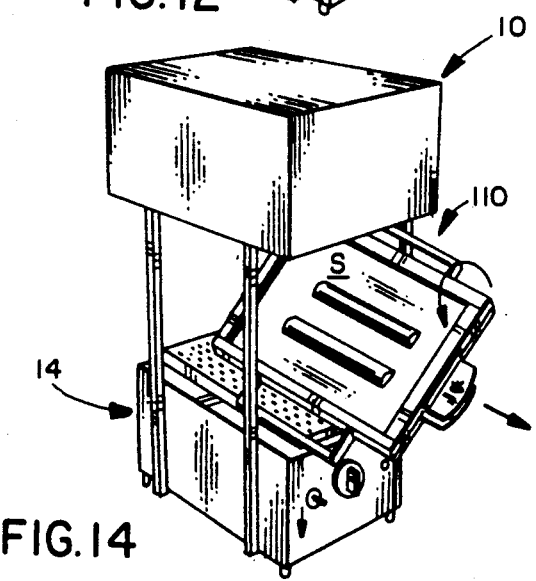

Referring to FIG. 14, after the vacuum sheet has been drawn down to conform to the workpieces, the plastic sheet is allowed to cool sufficiently so as to maintain the desired, conforming shape. Thereafter, the motor for the vacuum pump is de-energized and the carrier is lifted away from the vacuum table, being rotated about axis 170, so as to permit withdrawal of the carrier through the guide rails 62. The carrier may then be unlocked and opened to the position of FIG. 6, allowing the formed plastic sheet to be withdrawn therefrom.

Various modifications may be made to the above-described arrangements. For example, the magnetic gasket 150 could be replaced with a non-magnetic gasket such as that of a foam material. A user of the apparatus could be relied upon to maintain the engagement between the carrier and the top part 12 during heating of the plastic sheet, and such is made possible with the efficient and therefore rapid heating with the apparatus constructed according to the present invention, as described above. Alternatively, other means for releasably holding the carrier to the top part 12 could also be employed. For example, conventional snap fasteners could be employed.

As another alternative, the lower gasket 146 located at the bottom of carrier 110 which mates with the recessed border surrounding the platen, could be replaced by a flexible magnetic gasket to further aid in a rapid sealing engagement at the border 104. A magnetic rubber gasket is especially preferred for this application because, like the aforementioned gasket 150, a continuous airtight seal can also be achieved therewith.

One feature of the present invention is that the protruding guide surfaces, such as the guide surfaces 166, be provided for close fit confinement within the guide rails and for any engagement therewith that may be necessary to guide the carrier into alignment with the vacuum plate, so that an initial vacuum draw on the sheet can be quickly set up, and so that other advantages, such as those described above, can be obtained. The guide surfaces are conveniently located at the ends of handles, but could also be provided as surfaces of any outwardly projecting element, such as a leg of an L-shaped bracket. Certain advantages are, however, attained by locating the guide surfaces proximate the point of application of a carrier-displacing force.

Those skilled in the art will also readily appreciate that the vacuum plate could be replaced by a female mold member, having perforated depressions into which parts of the plastic sheet are drawn. Also, adaptors can be placed on top of the platen to raise the sealing surface in contact with the bottom side of the carrier. These adaptors provide spacing, or clearance for the mold depressions above the perforated plate. It is preferable that the adaptors comprise frames having a recessed border at their upper end, which is at least partly received in the bottom of the carrier.

Referring now to FIGS. 15-17, additional heater elements 40 are provided in an optional vacuum forming apparatus generally indicated at 210. The guide rails 262, 264, and the base 214 are, except for relative size, generally identical to the guide rails and the base described above with respect to FIGS. 1-14. Referring to FIGS. 16 and 17, the upper member 212 has an internal construction similar to that of top part 12 described above. In the embodiment 210 of the inventive apparatus, the upper member 212 is considerably larger than the upper member of the aforementioned apparatus 10, so as to accommodate four heating elements 40. In order to attain a uniform heating throughout, a plastic sheet is placed thereadjacent an additional deflector member 190 is mounted to the top wall 252 of the reflector shield assembly 246.

The carrier 310 is similar in shape and construction to the carrier 110 described above. The carrier 310 is, however, considerably larger, and it has been found convenient to provide dual clamping arrangements 328, 330 on the major sides of the carrier frame members. A hinged connection, not visible in FIG. 15, joins the major sidewalls of the carrier frame members opposite the clamping members. The handles 356 are located on the minor sidewalls of the carrier frame members, but are identical in construction and operation to the aforementioned handles 156, including a cooperative sliding engagement with the guide rails 262, 264.

Referring now to FIG. 18, an additional embodiment is illustrated at 510. Apparatus 510 includes a base member 514 having a platen 590, with an upper perforated vacuum plate 592. A lowered or recessed border 604 surrounds the perforated vacuum plate 592, and is similar in arrangement to the border 104 surrounding vacuum plate 92, as described above.

The base member 514 may be constructed so as to be identical to the base 14 described above, that is, it may include an outer housing having an internal mounting plate and a vacuum pump. However, the apparatus 510 preferably includes a connection socket 610, communicating with the interior of an enclosed chamber formed by base sidewalls 612, 614. A bottom plate, not visible in the figure, underlies the sidewalls of base 514 and forms a vacuum-tight enclosure therewith. The socket 610 is dimensioned to mate with a vacuum hose 620 of an external vacuum apparatus, such as a conventional vacuum cleaner.

The guide rails 562, 564 comprise hollow tubes of square cross-section and are identical to the aforementioned guide rails 62, 64, except for outwardly bent or flared free ends 563, 565. Apparatus 510 is intended for use with the aforementioned carrier 110 which is lowered into engagement with border 604, being passed between the guide rails 562, 564, in manner described above with respect to apparatus 10. The outwardly flared free ends 563, 565 of the guide rails provides an initial alignment for the carrier and, once the carrier passes downwardly below the flared free ends, the carrier is held in captive engagement with the guide rails, in the manner described above for apparatus 10. Further economies of manufacture are possible with apparatus 510, in that an external heating source may be employed to heat the plastic sheet within carrier 110. Apparatus 510 has been found to provide the same improved carrier guiding and vacuum forming features made possible with the above described apparatus 10.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. Apparatus for vacuum forming plastic sheets, comprising:
    an upper member having opposing sides;
    heater means in the upper member for softening said plastic sheets;
    a base member spaced beneath said upper member and having opposing sides, each located beneath a respective opposing side of said upper member;
    a vacuum table in said base member;
    two pairs of spaced, generally coextensive guide rails extending between said upper member and said base member, the guide rails of each pair having ends fixedly secured to a side of said upper member and a side of said base member;
    a carrier for holding a plastic sheet, having opposing sides and a handle outwardly protruding from each of said opposing sides, each handle positioned between a respective pair of guide rails, and each handle having two guide surfaces spaced apart from one another so as to be positioned immediately adjacent a guide rail so that said handles are confined by said guide rails as said carrier is translated between said upper member and said base member and so that said carrier is aligned generally parallel to said vacuum table when moved theretoward; and
    means for releasably holding said carrier adjacent said upper member while the plastic sheet held therein is softened by said heater means.

2. The apparatus of claim 1 wherein said upper member defines a downwardly opening chamber with a free end having a generally planar sealing surface generally parallel to the vacuum table.

3. The apparatus of claim 3 wherein said carrier includes sealing means for sealing engagement with said upper member to seal heat from the heater means therein when said carrier is releasably held theragainst.

4. The apparatus of claim 3 wherein said sealing means comprises said releasable holding means and includes a flexible magnetic gasket.

5. The apparatus of claim 1 wherein said base member includes a recessed border surrounding an upper portion of said vacuum table, with said carrier being proportioned to receive the upper portion of said vacuum table for alignment and sealing engagement therewith.

6. The apparatus of claim 5 wherein said carrier comprises upper and lower overlying frame members with opposed sheet-engaging surfaces for engaging said plastic sheet, said frame members being hingedly connected together at first ends and having interengaging releasable clamping means at their opposed ends.

7. The apparatus of claim wherein said lower frame member includes an upper sheet engaging surface which is generally parallel to said vacuum table when the sheet carried in said carrier is pressed against said vacuum table.

* * * * *